United States Patent [19]
Bodor et al.

[11] Patent Number: 5,585,133
[45] Date of Patent: Dec. 17, 1996

[54] REDUCED FAT RENNETED CHEESE PRODUCT AND A PROCESS OF MANUFACTURING IT

[76] Inventors: Janos Bodor, Prins Hendriklaan 38, Rijswijk, Netherlands, NL-2281 EC; Adriana M. Duineveld, Steenbroek 63, Breda, Netherlands, NL-4822 ZK; Mettina M. Koning, Bm. Hendrixstraat 46, Berkel & Rodenrijs, Netherlands, NL-2651 JV; Marcel Paques, Julianaweg 20a, Doorn, Netherlands, NL-3941 DM; Yvon M. Ijsseldijk, Rosier Fassenstraat 48b, Rotterdam, all of Netherlands, NL-3025 GP

[21] Appl. No.: 266,419

[22] Filed: Jun. 27, 1994

[30] Foreign Application Priority Data

Jun. 28, 1993 [EP] European Pat. Off. ............. 93201864

[51] Int. Cl.$^6$ ................................. A23C 19/068
[52] U.S. Cl. ........................ 426/582; 426/42; 426/583; 426/588
[58] Field of Search ............................. 426/42, 582, 583, 426/588

[56] References Cited

U.S. PATENT DOCUMENTS

| | | | |
|---|---|---|---|
| 3,882,250 | 5/1975 | Loter et al. ................. | 426/39 |
| 4,713,254 | 12/1987 | Childs et al. ............... | 426/582 |
| 5,213,827 | 5/1993 | Nauth et al. ............... | 426/582 |
| 5,334,398 | 8/1994 | Sueyasu et al. ............ | 426/582 |

FOREIGN PATENT DOCUMENTS

| | | | |
|---|---|---|---|
| 1248407 | 1/1989 | Canada ............... | A23C 19/09 |
| 0427310 | 5/1991 | European Pat. Off. ....... | A23C 19/05 |
| 0427307 | 5/1991 | European Pat. Off. ....... | A23C 9/15 |
| 2925568 | 1/1980 | Germany ............... | A23C 19/02 |
| 4016342 | 11/1990 | Germany ............... | A23C 19/076 |

OTHER PUBLICATIONS

Ariga et al., 91(08):P0108 FSTA, Japanese Journal of Dairy and Food Science, (1989) 38(4), A153–A159, (abstract only).

Davis, J. G., 71(10):p. 1660 FSTA, Milk Industry, (1971), 68(4) 8–11, (abstract only).

*Primary Examiner*—Helen Pratt
*Attorney, Agent, or Firm*—Cushman Darby & Cushman, LLP

[57] ABSTRACT

Cheese product essentially free of additives which are to be declared other than usual cheese product ingredients. The cheese product consists mainly of a renneted casein matrix having enclosed therein discrete agglomerates of acid casein in an amount of 5–35% wt. calculated on the total amount of protein contained in the cheese. A process of manufacturing this cheese product comprises adding 5–35% wt. of acid casein calculated on the total amount of protein solids to an emulsion and making the cheese product by renneting at temperatures above 20° C. while keeping it free from said additives.

5 Claims, No Drawings

REDUCED FAT RENNETED CHEESE PRODUCT AND A PROCESS OF MANUFACTURING IT

BACKGROUND OF THE INVENTION

The invention relates to reduced fat renneted cheese product and its manufacture.

In the present specification and claims the expression "reduced fat cheese product" is intended to embrace both non-fat cheese as the lower extreme and cheese products having a reduced fat content as compared with what would be expected when considering the taste and texture of conventional cheeses with pressed renneted full fat cheese having about 65% fat in dry matter as the upper extreme. The expression "rennet" includes any milk clotting enzyme which can be used for cheese making.

When manufacturing reduced fat cheese product one has in the past relied on the addition or incorporation of structuring agents such as gums, carboxymethyl cellulose (CMC) and starches or fat substitute additives, mostly of non milk origin or fat replacers such as heat denatured milk proteins which in many countries have to be declared as an ingredient on the ingredient list. Because of an increasing consumers distaste for such additives and un-naturalness it is an object of the invention to provide renneted cheese products having a reduced fat content as compared with a comparable standard cheese prepared from usual milk fat containing milk, which reduced fat cheese product is however devoid of structuring or fat replacing additives which are to be declared as an ingredient other than usual cheese ingredients. Usual cheese product ingredients which may be present in the product of this invention include milk and milk components, vegetables oils and fats, acidulants or starters, clotting enzyme, salts, spices, herbs, colouring matter and preservatives. Comparable referring in this context to taste, texture and organoleptic properties.

Another object is to provide a process for manufacture of cheese products according to this invention.

SUMMARY OF THE INVENTION

The present invention is directed to a reduced fat renneted cheese product essentially free of additives which are to be declared other than usual cheese product ingredients, mainly consisting of a renneted casein matrix having enclosed therein discrete agglomerates of acid casein in an amount of 5–35% wt calculated on total protein solids content. Preferably the amount of acid casein is between 10 and 25% wt.

Acid casein can be obtained by various processes: such as adding an edible acid or acid precursor to milk or skim milk adding acidifying microorganisms to milk or skim milk and allowing time at a suitable temperature for fermentation. Optionally whey proteins can be incorporated in the acid casein. In practice a pH value between 4,3 and 5,2 will yield a suitable acid casein for the product of the invention. If required the protein may be washed with water for removing the acid taste.

In order that the texture and mouth feel of conventional cheeses are simulated as much as possible the agglomerates preferably have a weight average particle size of 1–100 μm.

The invention also provides for a process of manufacturing the cheese product of the invention wherein a milk protein source acidified to a pH value of 4.3 to 5.2 is combined with an emulsion and the resulting combined product is subjected to a rennet cheese making process at temperatures above 20° C. while keeping it free of additives which are to be declared other than usual cheese product ingredients. For obtaining a perceptible effect 5–35% by weight of acidified milk protein on total protein solids is combined with the emulsion.

A suitable emulsion for the process of the invention is skim milk for obtaining non-fat cheese although an oil or fat containing emulsion can be used as well, resulting in a cheese product having less fat than organoleptically and on the basis of its structure would be expected. Even reduced fat cheese products can be obtained using this process.

The following examples are illustrating some presently preferred embodiments of the invention and various features thereof.

EXAMPLE 1

Commercial quark of pH 4,7 is washed once with an equal amount of tap water resulting in a product having a protein content of 24% wt. A Gouda type cheese is made starting from 250 kg milk having 1,25% fat content 1,8% wt. of the washed quark 47,5 g $CaCl_2.2aq$ 37,5 g $KNO_3$ 0,7% wt. acidulent culture (BOS)

0,03% wt. rennet

Renneting is allowed at a temperature of about 29° C. and thereafter a usual Gouda cheesemaking process is used. The resulting cheese is a Gouda cheese having 23% wt fat in dry matter. About 12% wt. of the total amount of protein originates from acid casein from the quark.

When compared with a traditional low fat Gouda cheese (having about 25% wt. fat in dry matter) a remarkable improvement in texture and organoleptic properties is noted suggesting a higher fat content.

Microscopic examination results in a structure in which solid dark areas represent the renneted casein matrix and roundish light coloured spots are fat globules both characteristic for usual renneted cheese and speckled areas which are characteristic for acid casein.

EXAMPLE II

Mozzarella cheese is usually prepared by standardizing milk at 2,5% fat in dry matter, pasteurizing, adding acidulant culture, ripening 40 minutes at 32° C., thereafter adding rennet and allowing to clot for half an hour, cutting, stirring, heating, resting, cutting again, kneading in hot water, moulding, brining and drying. According to the invention 1,2% wt fat in the milk and at the first ripening stage 1,8% of the washed quark as described in Example I is added. A clearly "creamier" product is obtained than would be obtained from 1,2% fat milk only. It almost resembles usual mozzarella.

We claim:

1. Non-fat cheese and cheese products having reduced fat content essentially free of structuring agents or fat substitute additives which are to be declared other than usual cheese ingredients, based on a renneted casein matrix having enclosed therein discrete agglomerates of acid casein in an amount of at least 5–35% wt. calculated on total protein solids content.

2. Cheese product according to claim 1, wherein 10–25% wt. of acid casein calculated on total protein solids is present.

3. Cheese product according to claim 1, wherein the agglomerates have a weight average particle size of 1–100µm.

4. Cheese product according to claim 1, characterized in that it is free of structuring additives.

5. Reduced fat cheese product according to claim 1 wherein the usual cheese ingredients include milk and milk components, vegetable oils and fats, acidulants or starches, clotting enzyme, salts, spices, herbs, coloring matter and preservatives.

* * * * *